Nov. 13, 1934.  W. G. GRAHAM  1,980,679
ANIMAL SLAUGHTERING APPARATUS
Filed Nov. 5, 1930  2 Sheets-Sheet 2
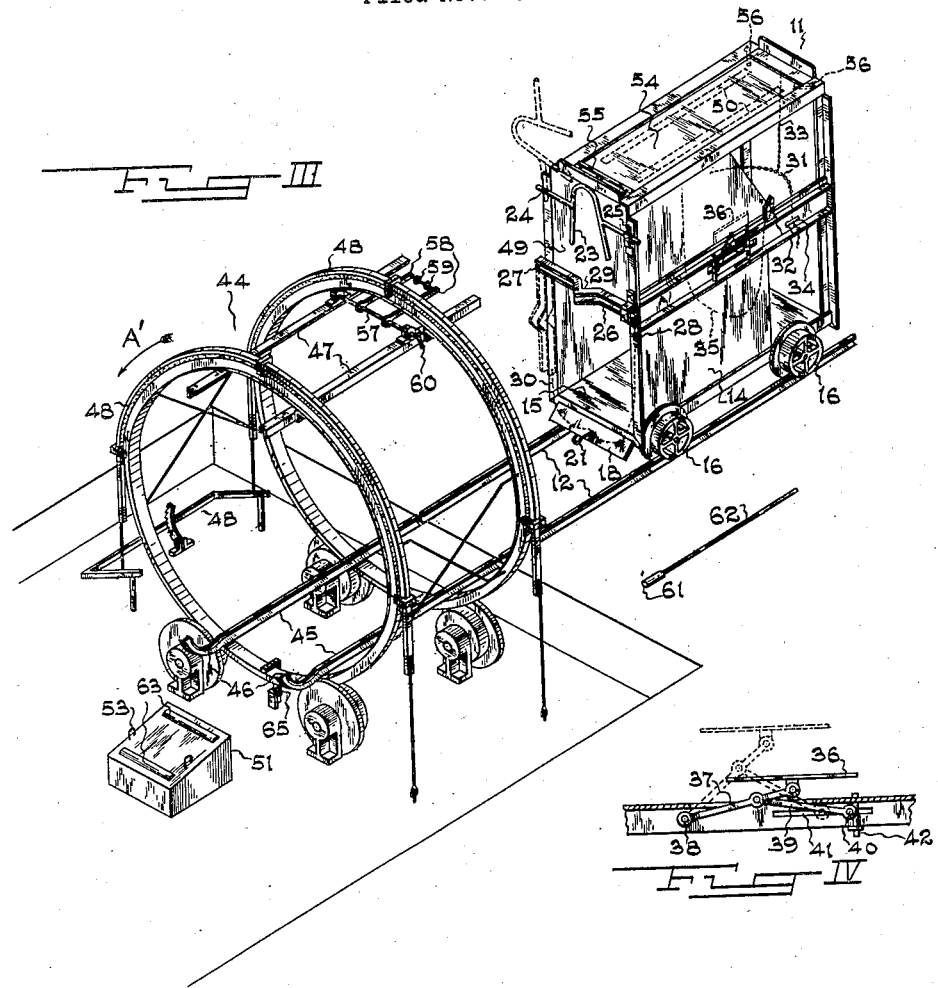
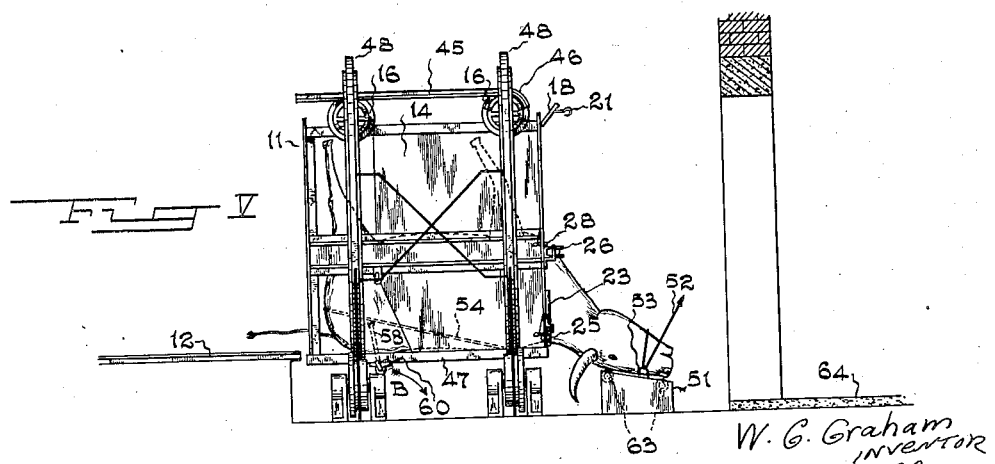
W. G. Graham
INVENTOR Patented Nov. 13, 1934

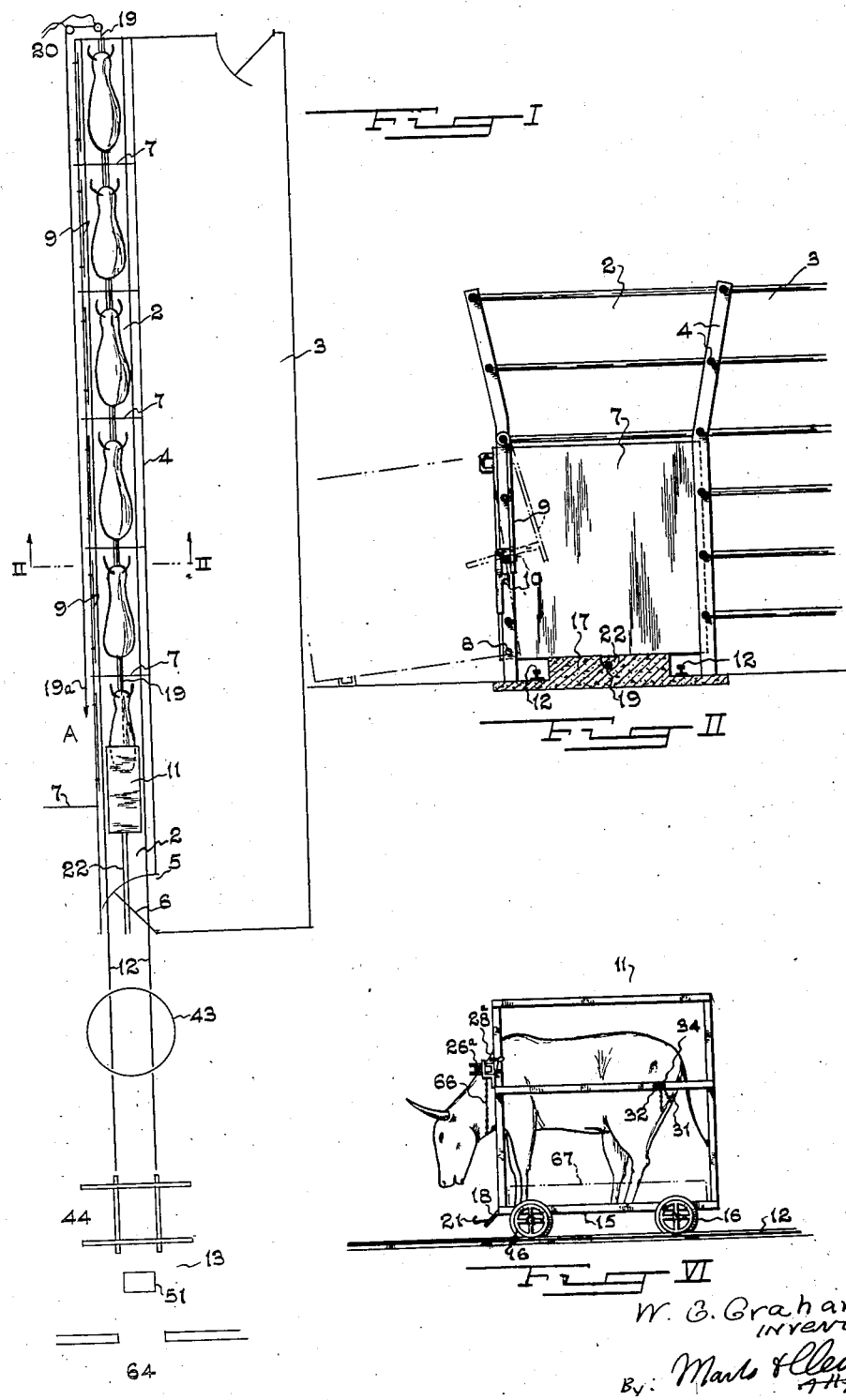

1,980,679

UNITED STATES PATENT OFFICE 1,980,679

ANIMAL-SLAUGHTERING APPARATUS

William George Graham, Brooklyn, Pretoria, Transvaal, Union of South Africa

Application November 5, 1930, Serial No. 493,621
In the Union of South Africa April 14, 1930

7 Claims. (Cl. 17—1)

This invention relates to the slaughtering of animals and particularly cattle, the general object being to effect the slaughtering in a manner which minimizes cruelty to the animal and protects the slaughterman against risk of injury. A more specific object is to capture the animal under conditions which do not excite fear, imprison it in such a way that it is incapable of resistance and is harmless to the attendants, and without releasing it—to transport it to the slaughtering position, bring it to the proper attitude for killing by the ritual method or otherwise and thereupon deposit the carcase mechanically upon the dressing floor.

The invention is illustrated in the accompanying drawings in which

Fig. I shows the general arrangement in plan;

Fig. II is an enlarged vertical section on line II—II Fig. I;

Fig. III shows the travelling stall and tippler therefor;

Fig. IV is an enlarged plan of the spacing plate;

Fig. V shows the stall in the tippler and the animal inverted for ritual killing; and Fig. VI is a side view of a modified form of stall.

The first specific object of the invention is to isolate and capture an animal in a manner which minimizes driving and handling, and avoids exciting it. One factor which contributes to this end is that the isolation of the animal is so effected that it is unaware of its separation from its companions. With this object an isolating pen 2 (Figs. I and II) is arranged contiguously to the waiting pen 3 in which the herd is contained, and is separated from the latter by a skeleton fence 4 not materially obstructing the animal's view of its companions.

The isolating pen is in the form of a passage just sufficiently wide to allow the animal to walk along it but not to allow it to turn round. It is convenient to make it long enough to contain a batch of animals, say six in number. The animals are driven through a gateway 5 at one end and therefore stand in it in single file, all facing in the direction away from the gateway. The gate 6 being closed, the isolation of the animals is completed by cross gates 7, one of which is inserted between each pair of animals. Said cross gates are conveniently pivoted at one lower corner 8 (Fig. II) and swing into or out of position in their own planes; the animals being induced to move forward or backward as may be necessary for the insertion of the gates between them.

The fences enclosing the isolation pens may be sloped outwardly at the top, Fig. II, for allowing wide horned animals to walk along the pens without their horns coming into contact with the fence.

The maintenance of the animals facing in the direction in which they enter being important, means may be provided to prevent a small animal from turning round. For this purpose there is shown, between each pair of isolating gates, a board 9 hinged to the fence at its upper edge so that it may be projected as shown in dotted lines in Fig. II. An adjustable latch 10 holds it projected to the desired extent.

It will be understood that from the humanitarian standpoint it is desirable to have the collecting and isolating pens well removed from the positions where the killing and flaying is effected, and that to keep the animals in the isolating pen in a peaceful state of mind, they should be faced away from the aforesaid positions.

The invention provides for transporting the animal to the slaughtering point; and doing so in such a manner that the animal is not exposed to influences which are likely to incite it to resist, and so also that it is powerless to resist should it attempt to do so.

For this purpose the invention provides the travelling stall 11 in which the animal is entrained and which runs on a rail track 12. The latter extends along the length of the isolating pen 2 and to the slaughter point 13 (Fig. I). The stall comprises a box-like body 14 fitted with a floor 15 and wheels 16 adapted to the track 12. An important feature of the invention is the method of loading the animal into the stall. If the animal relatively approaches the stall headfirst, that is if the animal is driven into the stall or the stall is moved to force the animal to step into it headfirst, there is considerable likelihood of the animal being frightened and attempting to escape. The invention overcomes this difficulty by letting the animal stand in its place in the isolation pen and moving the stall to envelope it from the rear, as indicated in Fig. I. When the animal feels the floor in the lower part of the stall touching its heels it lifts its feet and virtually steps backwards into the stall. In order that the floor of the stall may be close to the ground level of the animal the track 12 in the pen 2 is sunk at the sides of the paving 17 on which the animal stands; and to facilitate the entry of the animal, an apron 18 (Fig. III) is fixed to the front of the floor and slopes to the ground.

The animal being confined against forward movement by the isolating gate 7 in front of it, continues to step backwards over the floor of the stall as the latter is advanced. Then its forefeet are touched and it lifts them also, and continues to step backwards, until its body is fully within the stall. It will be noted that it is not necessary and is undesirable for the head of the animal to enter the stall, so that the animal never distinctly sees the latter, nor do the horns of the animal enter the stall, which is an important consideration when long horned cattle are being dealt with.

The described movement of the stall may be effected by an attendant while he stands for instance at a point A (Fig. I) which is outside the pen but alongside the animal so that he may control the animal while it is being entrained. For this purpose a rope 19 which passes around pulleys 20 at the head of the isolating pen and extends alongside said pen, is temporarily secured to the stall by a hook 21. The attendant can pull on the rope end 19ᵃ with one hand, leaving the other hand free to control the animal. The rope runs through a trough 22 in the paving 17 so that it will not be trodden on by the animals.

The animal, having thus entered the stall 11, is secured therein so that it is thereafter under complete control. Various devices may be used, that shown in Fig. III being a yoke 23 pivoted at 24 so that it can be brought down over the animal's neck and secured by an automatic latch 25. A bar 26 pivoted at 27 is brought up under the animal's neck and similarly secured by an automatic latch 28. This bar may be bent at 29 to conform to the shape of the animal. The animal's neck is thus completely secured. A chain 30 is attached to the bar so that the attendant may pull the bar up thereby from his position outside the isolation pen.

A breeching strap 31 which may be a leather covered chain, is fastened at one end to the stall wall and extends through a hole 32 in the side of the stall next to the attendant. This strap is originally left slack and may be hung from the roof by a chain 33, and is now pulled tight so as to confine the animal endwise between it and the yoke 23 and bar 26. It is locked by passing one of its links edgewise into a slot 34 extending from the hole 32. A similar chain or rope 35 positioned further forward in the stall may be pulled up under the animal to prevent it from lying down. To prevent a small animal from turning round in the stall, there is provided on one side a cramping plate 36 which can be advanced towards the side of the animal. The plate is shown as loosely mounted at the end of an arm 37 pivoted to the frame of the stall at 38. To said arm is pivoted one end of a link 39 having at its other end a pin 40 which slides in a slot 41 in the frame. By sliding the pin 40 along the slot, the plate 36 is advanced or retracted. The pin 40 is held at the desired position in the slot 41 by a removable lock pin 42.

The animal being thus secured and the rope 19 having been cast off, the stall 11 is moved along the track 12 to bring the animal to the slaughtering point 13. Since the carcase is to be discharged from the front end of the stall, it is usually necessary to reverse the movement of the stall during its journey, as by the use of a turntable 43.

The stall as described above is adapted particularly for ritual killing; and the apparatus and procedure for this purpose will be next described. At the killing point is a rotary tippler 44. This has rails 45 adapted to register with the track rails 12 and provided with end stops 46 to position the stall when the latter is run into the tippler. It also has angle irons or the like 47 which engage the top of the stall 11. Brake mechanism 48 or the like controls and stops its rotary motion. The stall is run into the tippler and the latter is rotated on its axis, for instance by manual force, so as to invert the stall and the animal within it. The inversion may be partial, or complete as described and illustrated. As the inversion proceeds the weight of the animal tends to drive the tippler, whereupon the brakes 48 are applied to prevent too rapid motion and finally to secure the tippler in the inverted position.

During the inversion the animal subsides without impact onto its side, the direction of rotation being, as indicated by the arrow A', such that the animal contacts with the smooth wall 49 of the stall opposite the cramping plate 36 and then onto its back on what was the roof of the stall. Ribs 50, pads or the like are arranged along the latter to keep the animal's weight from pressing on its back bone, and to keep it centrally positioned in the stall.

When the animal is thus inverted (Fig. V) its head comes near to the slaughterblock 51 provided for that purpose. A padded chain 52 or the like is fixed to one side of said block and passed through an eye 53 on the other side. The loop of the chain is drawn up by the attendant and passed over the inverted head of the animal, then drawn tight so as to pull the animal's head down onto the block and extend its neck. The killing is then effected. Thereupon the carcase is released by unshipping the chains 31 and 35 and swinging the bars 23 and 26 back to their dotted line positions. The carcase is discharged from the front of the stall by tilting the panel 54 which was the roof and now functions as the floor. This is a plain plate hinged to the box structure at its forward end 55 and normally retained in position at its rear end by clips 56. On the tippler is mounted a rocking shaft 57 having fixed to it arms 58 provided with rollers 59 and having also fixed to it an arm 60 to fit the socket 61 of a loose lever 62. The latter is slipped onto the arm 60 and pulled in the direction of the arrow B; so raising the arms 58 and thereby tilting the panel 54 up at the rear (as indicated by the dotted lines Fig. V) and causing the carcase to slide out of the stall by gravity, onto the block 51. The latter is also sloped and preferably provided with rollers 63 to facilitate the movement of the carcase on to the flaying floor 64. The tippler is righted, a stop 65 being provided to stop its rotation when it is upright; the stall 11 is moved back onto the track 12 for re-use.

In the case of non-ritual killing the tippler 44 is not required. In this case the stall may if desired be made of simpler construction. Neither the top 54 nor the flat side 49 nor the yoke 23 need be employed. Instead there may be a bar 26ᵃ Fig. VI similar to that described and which is brought down on the animal's neck and held by an automatic clip 28ᵃ, so as to pull the animal's head down conveniently for pithing. There may also be provided a chain 66 secured at one end to the bar 26ª which chain is passed under the animal's neck to prevent it lowering its head, the other end being detachably secured to the bar.

The carcase may be discharged from the front of the pen, by arranging the actual floor 15 to tilt similarly to the member 54 above described. The tilting may be effected by mechanism similar to that described, but mounted on the stall, or at a fixed point so that the stall will stand over it when at the killing point.

It may in some cases be more convenient to discharge the carcase from the side of the stall; and for that purpose the lower part of one side of the stall may be open, the tilting mechanism being positioned to lift the floor at one side as shown by the dotted lines 67. If the carcase is to be discharged from the side of the stall simultaneously with the pithing and the one end of the chain 66 is released and the floor is tilted by the above described mechanism, so that the impact of the carcase falling on the inclined floor 67 causes it to slide out of the open side of the stall.

I claim:—

1. An apparatus for slaughtering animals comprising a pen into which the animals are driven heads first, a stall having sides and a roof confining an animal so that the latter may be inverted by inversion of the stall and movable into the pen to successively confine an animal, a tippler distant from one end of the pen, said stall when removed from the pen being adapted to enter the tippler, and means for rotating the tippler to invert the stall and the animal therein.

2. An apparatus as claimed in claim 1 wherein a block is alined with the pen, and upon which the animals heads are adapted to rest and means carried by the block for tying an animal's head down to the block.

3. An apparatus for slaughtering animals comprising a pen having an entrance opening in one end and through which the animals are driven heads first, a track in the pen, a tippler alined with the entrance opening of the pen, a stall movable through the entrance opening of the pen and having an open end into which the animals are successively backed during forward movement of the stall, means between the pen and tippler for reversing the endwise position of the stall when moved from the pen, tracks on the tippler upon which the stall is received, and means for rotating the tippler to invert the stall and the animal therein.

4. An apparatus for slaughtering animals comprising a pen having an entrance opening in one end through which the animals are driven heads first into the pen, a trackway in the pen, a stall movable on the trackway into the pen and having a forward open end through which the animals are successively backed during forward travel of the stall, a turn table between the open ends of the pen and tippler, and upon which the stall is moved and the turn table operated to reverse the endwise position thereof, tracks on the tippler upon which the stall is moved, and means for rotating the tippler to invert the stall and the animals therein.

5. An apparatus for slaughtering animals comprising a pen into which the animals are driven, a stall movable into the pen for successively receiving the animals, a panel pivotally connected with the stall and constituting a roof therefor, a tripple distance from one end of the pen, said stall being movable from the pen into the tippler, means for rotating the tippler to invert the stall and the animal therein, and means carried by the tippler engaged with the panel to tilt the panel when the stall is inverted, as and for the purpose set forth.

6. An animal slaughtering apparatus comprising a rail track, a stall running on said rail track, means at one end of the stall for securing the animal's neck so that its head extends out of the stall, said stall having sides and a roof confining the animal so that the latter may be inverted by inversion of the stall, a rotary tippler, track rails in the tippler, means for securing the stall non-rotatively within the tippler and so that the animal's head is clear of the tippler, and means to secure the tippler with its rails alined with the track rails and also inverted therefrom.

7. Slaughtering apparatus as claimed in claim 6 comprising a hinged member in the stall which functions as the roof when the stall is upright and as the floor when the stall is inverted, and means on the rotary tippler engaging said member to tilt it and thereby eject the carcase from the stall.

WILLIAM GEORGE GRAHAM.